US008162500B2

(12) United States Patent
Kim et al.

(10) Patent No.: US 8,162,500 B2
(45) Date of Patent: Apr. 24, 2012

(54) BACKLIGHT UNIT AND LIQUID CRYSTAL DISPLAY DEVICE HAVING THE SAME

(75) Inventors: Do Yune Kim, Gumi (KR); Sung Hoon Baek, Daegu (KR)

(73) Assignee: LG Display Co. Ltd., Seoul (KR)

( * ) Notice: Subject to any disclaimer, the term of this patent is extended or adjusted under 35 U.S.C. 154(b) by 0 days.

(21) Appl. No.: 12/138,798

(22) Filed: Jun. 13, 2008

(65) Prior Publication Data

US 2008/0310160 A1 Dec. 18, 2008

(30) Foreign Application Priority Data

Jun. 14, 2007 (KR) ........................ 10-2007-0058251

(51) Int. Cl.
*F21V 7/18* (2006.01)
(52) U.S. Cl. .. 362/97.3; 362/800; 362/623; 362/249.02; 362/247
(58) Field of Classification Search .................. 362/245, 362/612, 623–625, 631, 247, 249.02, 269.01; 349/69, 61, 62, 63, 64
See application file for complete search history.

(56) References Cited

U.S. PATENT DOCUMENTS

| 5,779,351 | A  | * | 7/1998  | Erickson et al. | 362/241 |
|-----------|----|----|---------|-----------------|---------|
| 7,108,385 | B2 | * | 9/2006  | Huang et al.    | 362/631 |
| 7,175,329 | B1 | * | 2/2007  | Chou            | 362/612 |
| 7,287,891 | B1 | * | 10/2007 | Park et al.     | 362/555 |
| 7,374,326 | B2 | * | 5/2008  | Huang et al.    | 362/612 |
| 7,374,360 | B1 | * | 5/2008  | Szekely         | 401/265 |
| 7,434,977 | B2 | * | 10/2008 | Fukasawa et al. | 362/631 |
| 7,478,929 | B2 | * | 1/2009  | Kim             | 362/297 |
| 7,481,553 | B2 | * | 1/2009  | Kim et al.      | 362/240 |
| 7,530,711 | B2 | * | 5/2009  | Bang            | 362/241 |
| 2006/0103776 | A1 | * | 5/2006  | Park         | 349/58  |
| 2006/0164840 | A1 | * | 7/2006  | Song et al.  | 362/341 |
| 2006/0187660 | A1 | * | 8/2006  | Liu          | 362/294 |
| 2006/0193148 | A1 | * | 8/2006  | Bang         | 362/607 |
| 2006/0215075 | A1 | * | 9/2006  | Huang et al. | 349/67  |
| 2007/0002565 | A1 | * | 1/2007  | Han et al.   | 362/240 |
| 2007/0002590 | A1 | * | 1/2007  | Jang et al.  | 362/633 |
| 2007/0279937 | A1 | * | 12/2007 | Hsiao et al. | 362/613 |
| 2008/0225512 | A1 | * | 9/2008  | Roberts et al. | 362/97 |

* cited by examiner

*Primary Examiner* — Robert May
*Assistant Examiner* — Leah S Macchiarolo
(74) *Attorney, Agent, or Firm* — Brinks Hofer Gilson & Lione

(57) ABSTRACT

Disclosed are a backlight unit and a liquid crystal display device having the same. A supporting section is formed with a reflector, which is used for a direct type backlight unit, to support optical sheets and guide light, so that the assembling process is simplified and the manufacturing cost is reduced.

9 Claims, 3 Drawing Sheets

BACKLIGHT UNIT AND LIQUID CRYSTAL DISPLAY DEVICE HAVING THE SAME

This application relies for priority upon Korean Patent Application No. 10-2007-0058251 filed on Jun. 14, 2007, the contents of which are herein incorporated by reference in their entirety.

BACKGROUND

1. Field of the Invention

The present invention relates to a liquid crystal display device.

2. Description of the Related Art

In general, a CRT (Cathode Ray Tube) is extensively used as a monitor in measurement instruments and information terminals, as well as televisions. However, the heavy weight and large size of the CRT do not mate with a current trend of miniaturization and light weight of electronic appliances.

A liquid crystal display device has been developed as a solution for the above problems. Liquid crystal display devices have advantages of being lightweight, compact and having a slim structure, and low-power consumption as compared with the CRT. In particular, since the liquid crystal display device using a thin film transistor can realize high definition, a large structure and a colorful display of a display screen similar to the CRT, the liquid crystal display device has been recently used in various fields, such as a notebook computer and in the monitor market.

Since the liquid crystal display device is a non-emissive device, which displays an image by controlling the amount of light received from the outside light source, the liquid crystal display device must have an additional light source, such as a backlight unit, for irradiating light to a liquid crystal display panel. Such a backlight unit is divided into a direct type backlight unit and an edge type backlight unit according to the position of the light source that emits light.

The light source includes a CCFL (Cold Cathode Fluorescent Lamp) and an HCFL (Hot Cathode Fluorescent Lamp). According to the conventional direct type backlight unit, a plurality of fluorescent lamps are disposed on the inner side of a lower cover and a fixing structure is provided to fix both sides of the fluorescent lamps.

However, when using the fixing structure constituting the backlight unit, the assembling process of the liquid crystal display device may be complicated and the brightness of light emitted from the fluorescent lamp may be lowered. In addition, since the fixing structure must be fabricated through an additional process, the manufacturing cost is increased.

SUMMARY

A backlight unit and a liquid crystal display device having the same, are disclosed in which an LED (Light Emitting Diode) is used a light source of a direct type backlight unit and both edges of a reflector are modified to serve as a light guide and a supporting section.

It is to be understood that both the foregoing general description and the following detailed description of the present invention are exemplary and explanatory, and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF EMBODIMENTS

Figure 1:
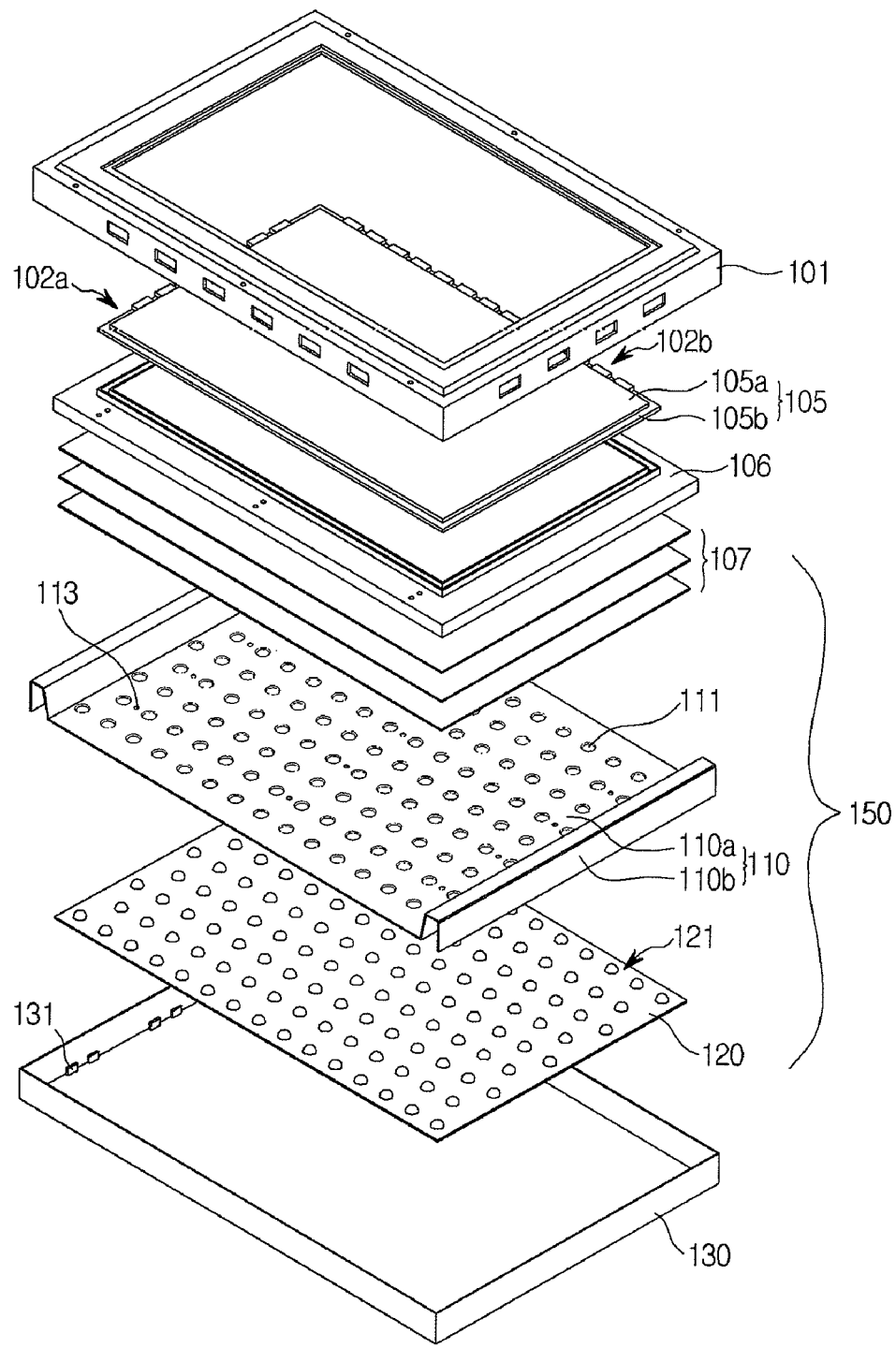
FIG. 1 is an exploded perspective view representing a liquid crystal display device according to an embodiment.

FIG. 1 is an exploded perspective view representing a liquid crystal display device according to and embodiment.

As shown in FIG. 1, the liquid crystal display device 100 includes a liquid crystal display panel 105 for displaying an image and a backlight unit 150, which is disposed on a rear side of the liquid crystal display panel 105 to irradiate light. The liquid crystal display device 100 further includes a mold frame 106, a lower cover 130 and an upper cover 101 to fixedly accommodate the backlight unit 150 and the liquid crystal display panel 105.

A liquid crystal display panel 105 includes a color filter substrate 105a having an RGB color filter layer and a TFT substrate 105b having a TFT (Thin Film Transistor) and a pixel electrode, in which the color filter substrate 105a is combined with the color TFT substrate 105b while interposing a liquid crystal layer (not shown) therebetween. A gate pad area 102a and a data pad area 102b are formed on an edge of the liquid crystal display panel 105 to provide a gate driving signal and a gate signal.

The backlight unit 150 includes a printed circuit board 120, on which a plurality of LED chips 121 including GRB LEDs or white LEDs are disposed, a reflector 110, which is disposed on the printed circuit board 120 to reflect light, and optical sheets 107, which are disposed on an upper part of the printed circuit board 120 to diffuse and collect light.

The reflector 110 according to the present invention includes a reflecting section 110a, which is attached to the printed circuit board 120 to reflect light, and a supporting section 110b, which is integrally formed with the reflecting section 110a and disposed at a rim of the printed circuit board 120 to guide light emitted from the LED chip 121 while supporting the optical sheets 107.

First holes 111 are formed in the reflecting section 110a of the reflector 110 to expose a plurality of LED chips 121 disposed on the printed circuit board 120. Second holes 113 are formed in the reflecting section 110 to fix the reflecting section 110a of the reflector 110 to the printed circuit board 120.

In addition, the supporting section 110b of the reflector 110 is formed by bending both edges of the reflector 110 in a predetermined direction to support the optical sheets 107. The supporting section 110b has an inclination surface adjacent to the reflecting section 110a such that light emitted from the LED chips 121 is reflected from the inclination surface to travel toward the center region of the reflecting section 110a.

Although the supporting section 110b is formed only on the both edges of the reflector 110 in the drawing, the supporting section can also be formed along the rim of the reflector 110.

The backlight unit 150 including the printed circuit board 120 on which the LED chips 121 are disposed, the reflector 110 and the optical sheets 107 is accommodated in the lower cover 130 and is encased by the mold frame 106.

A plurality of fixing parts 131 are formed on the inner side of the lower cover 130 at a predetermined interval to prevent the supporting section 110b of the reflector 110 from moving.

The fixing parts 131 are formed along an edge of the inner side of the lower cover 130 corresponding to the supporting section 110b of the reflector 110. When the printed circuit board 120 is accommodated in the lower cover 130 to be coupled with the reflector 110, an edge of the supporting section 110b is coupled between the lower cover 130 and the fixing part 131 formed on the inner side of the lower cover 130. The structure of the fixing part 131 will be described in detail with reference to FIG. 4.

As described above, if the components of the backlight unit 150 have been accommodated in the lower cover 130 and then encased by the mold frame 106, the liquid crystal display panel 105 is mounted on an upper side of the mold frame 106. After that, the upper cover 101 is coupled with the mold frame 106 and the lower cover 130.

According to the conventional direct type backlight unit, an additional structure is fixed to both edges of the lower cover to support the optical sheets and guide light. However, according to the present invention, the direct type LED backlight unit 150 is provided with the reflector 110 having a structure including the reflecting section 110a and the supporting section 110b, so that the process of assembling the structure for supporting the optical sheets and guiding light is omitted. That is, the supporting section 110b integrally formed with the reflecting section 110a serves to support the optical sheets and guide light.

As a result, according to the present invention, a portion of the reflector 110 having a superior reflective characteristic serves as a supporting section for supporting the optical sheets, so that the assembling work can be improved and the light efficiency can be enhanced.

Figure 2:
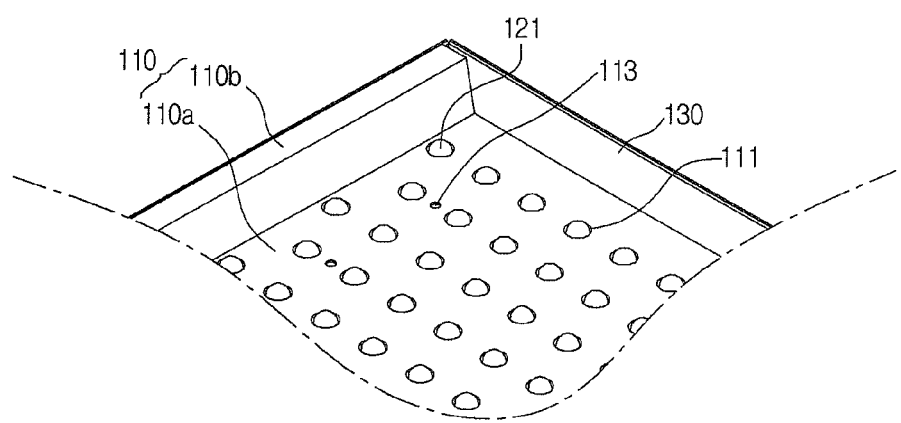
FIG. 2 is a view representing the coupling state of an LED chip and a reflector of a backlight unit according to the embodiment.

FIG. 2 is a view representing the coupling state of the LED chips and the reflector of the backlight unit according to the present invention.

As shown in FIG. 2, the printed circuit board (not shown), on which a plurality of LED chips 121 are disposed, is accommodated in the lower cover 130 of the liquid crystal display device. The reflector 110 is attached on the printed circuit board.

The reflector 110 includes the reflecting section 110a and the supporting section 110b. The reflecting section 110a is directly attached to the printed circuit board, and the supporting section 110b is fixed to both edges of the lower cover 130. The first and second holes 111 and 113 are formed in the reflecting section 110 of the reflector 110. The first holes 111 allow the LED chips 121 to be exposed to the outside of the reflecting section 110a. The second hole 113 allows the reflecting section 110a of the reflector 110 to be attached to the printed circuit board on which the LED chips 121 are disposed. Accordingly, a coupling part, such as a screw, a bolt, or a pin, is formed on an area of the second hole 113 such that the reflecting section 110a of the reflector 110 can be fixed and attached to the printed circuit board on which the LED chips 121 are disposed.

In addition, the supporting section 110b of the reflector 110 is integrally formed with the reflecting section 110a except for an area of the lower cover 130 on which LED chips 121 are disposed. The supporting section 110b has the inclination surface at an area where the supporting section 110b makes contact with the reflecting section 110a, and is provided with an upper surface having a predetermined width such that the optical sheets can be stably mounted on the upper surface.

Thus, according to the present invention, when the reflector 110 is assembled after the printed circuit board has been accommodated in the lower cover 130, the supporting section 110b for supporting the optical sheets is simultaneously assembled, so that the assembling process is simplified. In addition, additional structure is not required, so that the manufacturing cost can be reduced.

Figure 3A:
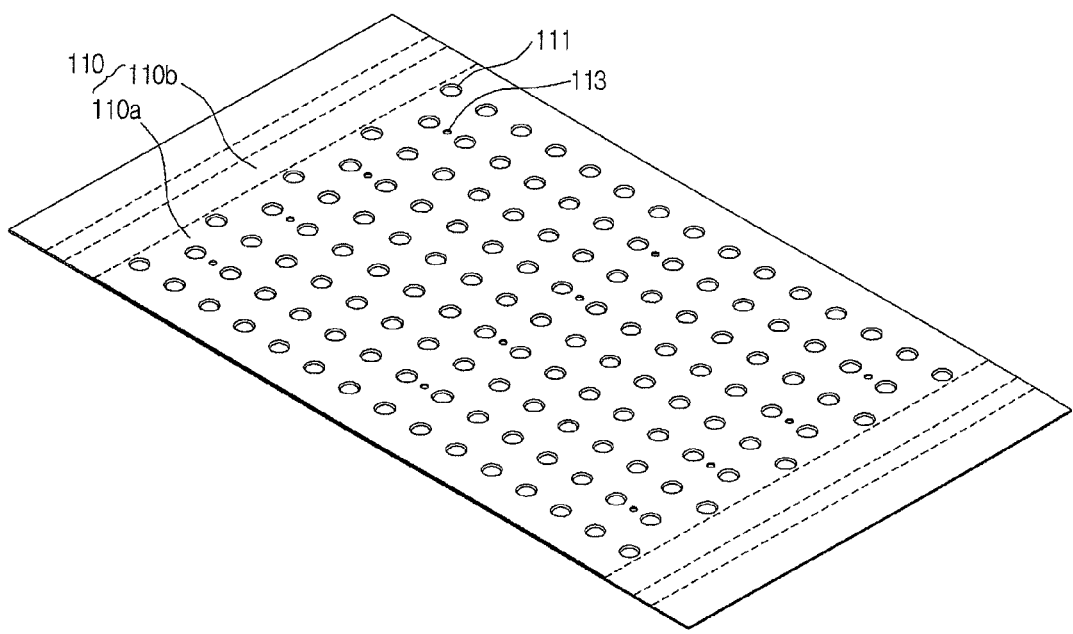
FIGS. 3A and 3B are views representing a structure of the reflector used in the backlight unit according to the embodiment.
Figure 3B:
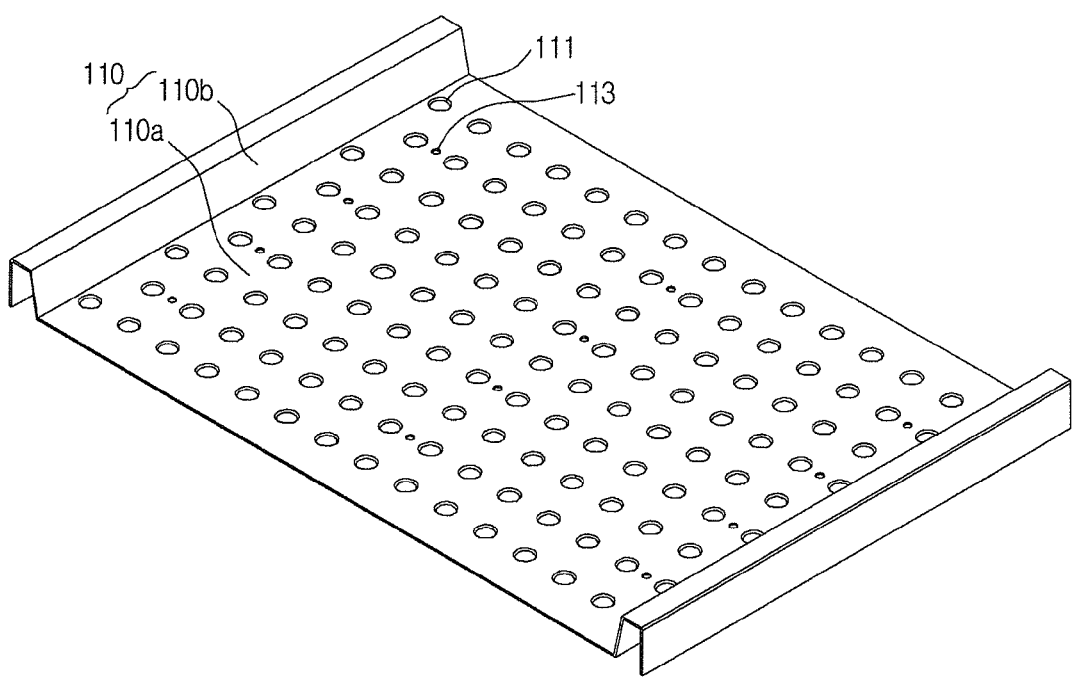

FIGS. 3A and 3B are views representing a structure of the reflector used in the backlight unit according to the present invention.

As shown in FIGS. 3A and 3B, the reflector 110 is divided into an area for the reflecting section 110a and an area for the supporting section 110b which are integrally formed with each other. In addition, since the reflector 110 includes hard material such as MCPET (Micro-foaming Polyethylene-terephthalate), the reflector 110 can support the optical sheets disposed on the upper side of the reflector 110.

The first and second holes 111 and 113 are formed on the reflecting section 110a of the reflector 110 such that the LED chips are exposed and the reflector 110 is attached to the printed circuit board. In addition, a plurality of slits are formed in the area for the supporting section 110b such that the reflector 110 can be formed with the supporting section 110b by folding a portion of the reflector 110 along the slits. That is, when the process of assembling the liquid crystal display device is performed, if the reflector 110 is folded along the slits, the supporting section 110b can be formed at both edges of the reflecting section 110a as shown in FIG. 3B, and then the reflector 110 is attached to the printed circuit board.

After that, the reflector 110 is coupled to the lower cover in which the printed circuit board is accommodated. The coupling part, such as a screw, a bolt, or a pin, is fastened into the second hole 113, so that the reflecting section 110a of the reflector 110 is attached to the printed circuit board on which the LED chips are disposed. The supporting section 110b formed at both sides of the reflecting section 110a is coupled to the fixing part (131 shown in FIG. 1) formed on the inner side of the lower cover. The supporting section 110b is provided with the upper surface having a few centimeters of width to support the optical sheets including a plurality of sheets.

In addition, the inclination surface is formed from an edge, at which the reflecting section 110a and the supporting section 110b of the reflector 110 intersect each other, toward the upper surface of the supporting section 110b, such that light emitted from the LED chips of the printed circuit board can be reflected from the inclination surface of the supporting section 110, thereby improving the light efficiency.

Although the supporting section 110b is formed at the both edges of the reflecting section 110a of the reflector 110 in the drawing, the supporting section 110b can also be formed on the rim of the reflecting section 110a.

Figure 4:
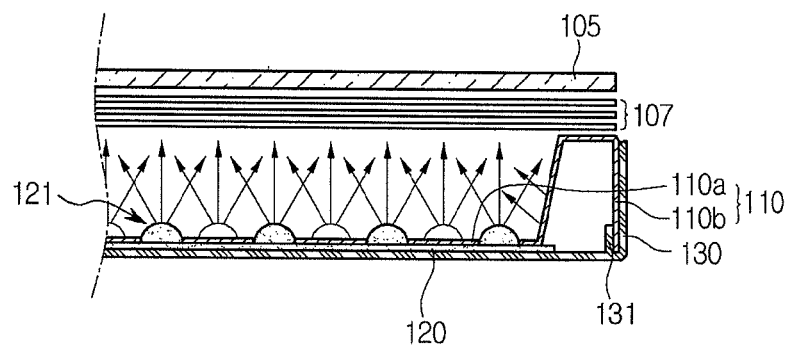
FIG. 4 is an assembled sectional view representing a liquid crystal display device according to the embodiment.

FIG. 4 is an assembled sectional view representing the liquid crystal display device according to the present invention.

As shown in FIG. 4, according to the liquid crystal display device of the present invention, the printed circuit board 120, on which the LED chips 121 are disposed, is accommodated in the lower cover 130. The reflector 110 is disposed on the upper side of the printed circuit board 120. The reflector 110 includes the reflecting section 110a directly attached to the printed circuit board 120 and the supporting section 110b that serves to support the optical sheets 107 and guide light.

The LED chip 121 of the printed circuit board 120 is exposed to the upper side of the reflecting section 110a through the holes (shown in FIG. 2) formed in the reflecting section 110A. The supporting section 110b of the reflector 110 has the edge portion, which is inserted between the fixing part 131 formed on the inner side of the lower cover 130 and the inner side of the lower cover 130. The fixing parts 131 are disposed on the inner side of the lower cover 130 at a predetermined interval corresponding to the supporting section 110b of the reflector 110.

After the reflector 110 and the printed circuit board 130 have been assembled with the lower cover 130 as described above, the optical sheets 107 are disposed on the upper side of the reflector 110. As a result, the optical sheets 107 are mounted on the supporting section 110b of the reflector 110. After that, the backlight unit is fixed to the lower cover 130 by the mold frame (106, shown in FIG. 1), and the liquid crystal display panel 105 is assembled.

As shown in the drawings, the LED chips 121 disposed on the printed circuit board 120 are exposed on the reflecting section 110a of the reflector 110. In addition, light emitted from the LED chips 121 travels toward the optical sheets 107. The light traveling toward the supporting section 110b formed on the edge of the reflector 110 is reflected from the inclination surface of the supporting section 110b and then travels toward the center area of the lower cover 130.

According to the present invention, the supporting section 110b is integrally formed with the reflector 110 such that the supporting section 110b supports the optical sheets 107 and allows light leaking to the edge of the lower cover 130 to be collected to the center area of the lower cover 130, so that the light efficiency is improved.

As described above in detail, according to the present invention, the direct type backlight unit uses the LED (Light Emitting Diode) as a light source thereof and the both edges of the reflector are modified to serve as a light-guide and a supporter of the optical sheets.

In addition, the supporting section for supporting the optical sheets and guiding light is integrally formed with the reflector, so that the assembling process is simplified and the manufacturing cost is reduced.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A backlight unit comprising:
a plurality of LED chips;
a printed circuit board on which a plurality of LED chips are disposed and a pattern for supplying power is formed;
optical sheets, which are disposed on an upper side of the printed circuit board, to collect and diffuse light emitted from the LED chips; and
a reflector, which is disposed on the printed circuit board and includes a reflecting section that reflects light emitted from the LED chips and a supporting section that supports the optical sheets,
wherein the supporting section of the reflector is integrally formed with the reflecting section of the reflector,
wherein the supporting section has a structure of being bent
wherein the supporting section includes a first surface bending with an upper direction, a second surface bending with an outside direction and a third surface bending with a lower direction,
wherein the reflecting section of the reflector includes a plurality of first holes exposing the LED chips of the printed circuit board to the outside and a plurality of second holes fixing the reflecting section to the printed circuit board using a coupling part;
wherein the diameter of the first hole is larger than the diameter of the second hole.

2. The backlight unit as claimed in claim 1, wherein the supporting section of the reflector is integrally formed with both edges of the reflecting section or a rim of the reflecting section.

3. The backlight unit as claimed in claim 1, wherein the LED chip includes RGB LEDs or white LEDs.

4. The backlight unit as claimed in claim 1, wherein the supporting section includes said first surface is extended from the reflecting section, said second surface is extended from the first surface and said third surface is extended from the second surface.

5. The backlight unit as claimed in claim 4, wherein the edges of the lower surface of the optical sheet are placed on the second surface.

6. A liquid crystal display device comprising:
a liquid crystal display panel;
a backlight unit including a plurality of LED chips that supply light to the liquid crystal display panel, a printed circuit board on which the LED chips are disposed and a pattern for supplying power is formed, optical sheets, which are disposed on an upper side of the printed circuit board, to collect and distribute light emitted from the LED chips, and a reflector, which is disposed on the printed circuit board and includes a reflecting section for reflecting light emitted from the LED chips and a supporting section that supports the optical sheets;
a lower cover that receives the backlight unit; and
a plurality of fixing parts are formed along an edge of an inner side of the lower cover corresponding to the supporting section of the reflector to fix the supporting section
wherein the supporting section of the reflector is integrally formed with the reflecting section of the reflector,
wherein the supporting section has a structure of being bent
wherein the supporting section includes a first surface bending with an upper direction, a second surface bending with an outside direction and a third surface bending with a lower direction,
wherein an edge of the third surface is coupled between the inner side of the lower cover and the fixing part; and
wherein the reflecting section of the reflector includes a plurality of first holes exposing the LED chips of the printed circuit board to the outside and a plurality of second holes fixing the reflecting section to the printed circuit board using a coupling part.

7. The liquid crystal display device as claimed in claim 6, wherein the supporting section of the reflector is integrally formed with both edges of the reflecting section or a rim of the reflecting section.

8. The liquid crystal display device as claimed in claim 6, wherein the supporting section includes said first surface is extended from the reflecting section, said second surface is extended from the first surface and said third surface is extended from the second surface.

9. The liquid crystal display device as claimed in claim 6, wherein the edges of the lower surface of the optical sheet are placed on the second surface.

* * * * *